(12) United States Patent
Xu et al.

(10) Patent No.: US 9,062,209 B2
(45) Date of Patent: *Jun. 23, 2015

(54) POLYMER ENCAPSULATED ALUMINUM PARTICULATES

(75) Inventors: Chang Xu, Macungie, PA (US); Hai Hui Lin, Naperville, IL (US); Parfait Jean Marie Likibi, Mount Pleasant, SC (US)

(73) Assignee: Silberline Manufacturing Company, Inc., Tamaqua, PA (US)

( * ) Notice: Subject to any disclaimer, the term of this patent is extended or adjusted under 35 U.S.C. 154(b) by 287 days.

This patent is subject to a terminal disclaimer.

(21) Appl. No.: 12/904,711

(22) Filed: Oct. 14, 2010

(65) Prior Publication Data

US 2011/0130510 A1   Jun. 2, 2011

Related U.S. Application Data

(60) Provisional application No. 61/265,625, filed on Dec. 1, 2009.

(51) Int. Cl.
| | |
|---|---|
| *C09D 11/10* | (2014.01) |
| *C08F 8/00* | (2006.01) |
| *C09C 3/10* | (2006.01) |
| *C09C 1/62* | (2006.01) |
| *C09C 1/64* | (2006.01) |

(Continued)

(52) U.S. Cl.
CPC . *C09C 3/10* (2013.01); *C09D 5/028* (2013.01); *C08K 3/08* (2013.01); *C08K 3/22* (2013.01); *C08K 9/08* (2013.01); *C09C 1/62* (2013.01); *C09C 1/644* (2013.01); *C09C 1/648* (2013.01); *C09C 3/12* (2013.01); *C09D 7/1225* (2013.01)

(58) Field of Classification Search
None
See application file for complete search history.

(56) References Cited

U.S. PATENT DOCUMENTS

| | | | |
|---|---|---|---|
| 2,885,366 | A | 5/1959 | Iler |
| 3,954,496 | A | 5/1976 | Batzar |

(Continued)

FOREIGN PATENT DOCUMENTS

| | | |
|---|---|---|
| JP | 58-179254 | 10/1983 |
| JP | 2000-273349 | 10/2000 |

(Continued)

OTHER PUBLICATIONS

Y. Chen et al., "Improvement of polyacrylate coating by filling modified nano-TiO$_2$," Applied Surface Science 252 (2006) p. 8635-8640.

(Continued)

*Primary Examiner* — Ronak Patel
(74) *Attorney, Agent, or Firm* — Hamre, Schumann, Mueller & Larson, P.C.

(57) ABSTRACT

A coated platelet that includes a robust polymer coating that has substantially uniform structures, a method for producing the coated platelet and a system that includes the coated platelet are described. The disclosed method involves immobilizing initiator molecules onto the surfaces of the platelet by using surface coupling groups and polymerization from initiating sites of the initiator anchored on the surface of the platelet. The disclosed method allows uniform growth of the polymer chains so as to produce robust coated platelets with a smooth coated surface. The disclosed system includes only the disclosed coated platelet and a solvent and eliminates the need to add polymer resins separate from the resins that are covalently attached to the platelet.

5 Claims, 3 Drawing Sheets

Schematic illustration of polymer chains on pigment surfaces

(51) Int. Cl.
*C09C 3/12* (2006.01)
*C09D 7/12* (2006.01)
C09D 5/02 (2006.01)
C08K 3/08 (2006.01)
C08K 3/22 (2006.01)
C08K 9/08 (2006.01)

(56) References Cited

U.S. PATENT DOCUMENTS

| | | |
|---|---|---|
| 4,213,886 A | 7/1980 | Turner |
| 4,565,716 A | 1/1986 | Williams, Jr. et al. |
| 4,693,754 A | 9/1987 | Kondis |
| 4,808,231 A | 2/1989 | Kondis et al. |
| 5,037,475 A * | 8/1991 | Chida et al. ............ 106/403 |
| 5,763,548 A | 6/1998 | Matyjaszewski et al. |
| 6,353,107 B1 | 3/2002 | Kramer et al. |
| 6,761,762 B1 | 7/2004 | Greiwe et al. |
| 7,205,362 B2 | 4/2007 | Favier et al. |
| 7,479,323 B2 | 1/2009 | Rathschlag et al. |
| 2002/0185378 A1* | 12/2002 | Honeyman et al. ........ 204/601 |
| 2004/0024090 A1* | 2/2004 | Suda et al. ............... 523/160 |
| 2006/0046194 A1* | 3/2006 | Hoshi et al. ............. 430/270.1 |
| 2007/0298259 A1 | 12/2007 | Matsumoto |
| 2008/0057310 A1* | 3/2008 | Ohno et al. ............... 428/402 |
| 2008/0249209 A1 | 10/2008 | Trummer et al. |
| 2008/0269374 A1* | 10/2008 | Ganapathiappan ........ 523/201 |

FOREIGN PATENT DOCUMENTS

| | | |
|---|---|---|
| JP | 2001-098206 | 4/2001 |
| JP | 2003-096334 | 4/2003 |
| JP | 2005-290036 | 10/2005 |
| JP | 2006-328309 | 10/2006 |
| JP | 2008-266472 | 11/2008 |
| JP | 2009-084430 | 4/2009 |
| JP | 2009-299044 | 12/2009 |
| JP | 2010-254934 | 11/2010 |
| WO | 01/92359 | 12/2001 |
| WO | 2007/145285 | 12/2007 |
| WO | 2009/087021 | 7/2009 |

OTHER PUBLICATIONS

I.E. Dunlop et al., "Direct Measurement of Normal and Shear Forces between Surface-Grown Polyelectrolyte Layers," J. Phys. Chem. B 113 (2009) p. 3947-3956.

Office Action for Russian patent application No. 2010149248, dated Jan. 22, 2015 (10 pages, including English translation).

Entsiklopediya polimerov [Encyclopedia of Polymers] ed. by Kargin V.A. Moscow, Sovetskaya Entsiklopedia, 1972, v.1, pp. 270-271, 277.

Entsiklopediya polimerov [Encyclopedia of Polymers] ed. by Kabanov V.A. Moscow, Sovetskaya Entsiklopedia, 1977, v.3, p. 651.

* cited by examiner

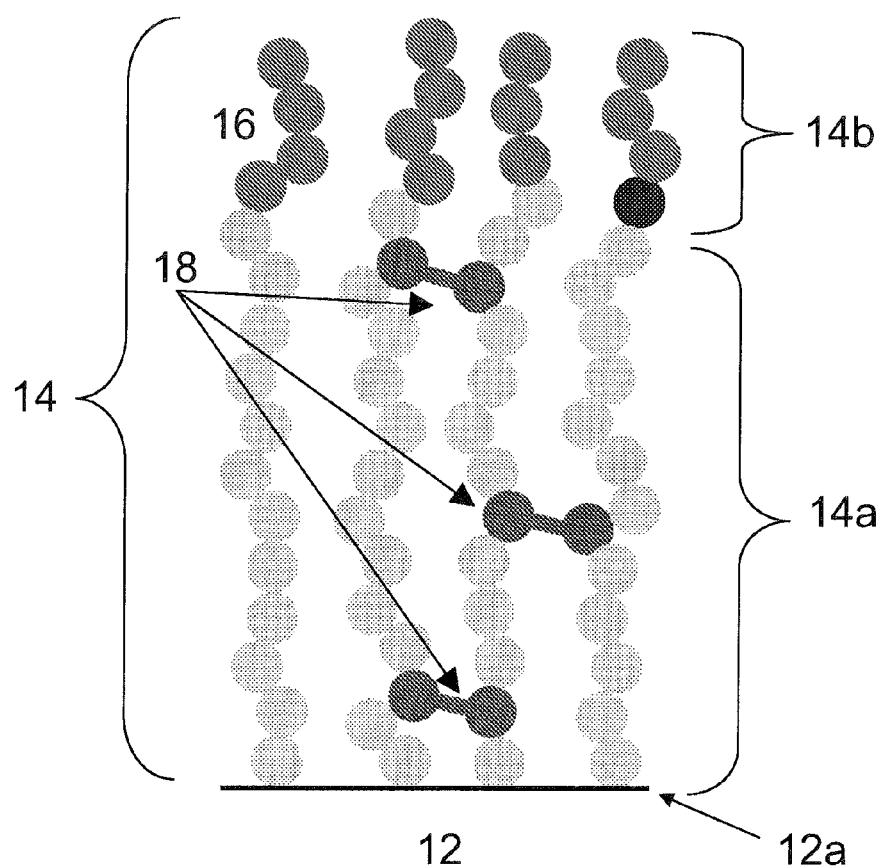
Figure 1. Schematic illustration of polymer chains on pigment surfaces
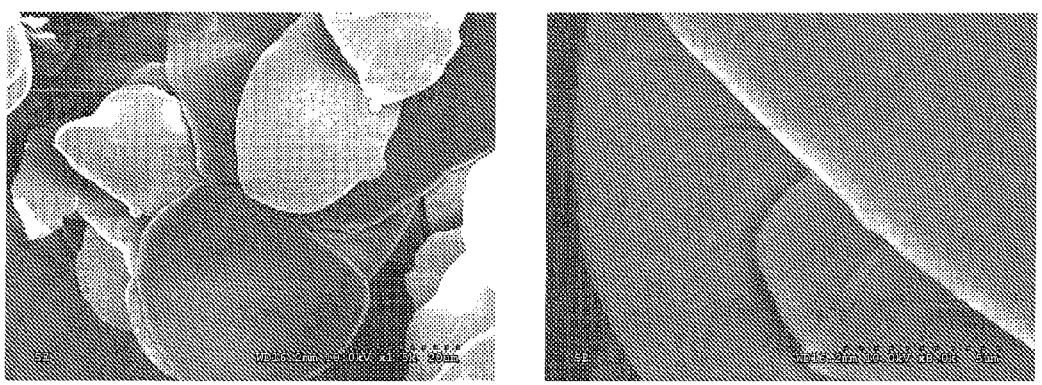
Figure 2. Scanning electron micrograph of polystyrene coated Sparkle Silver 3622

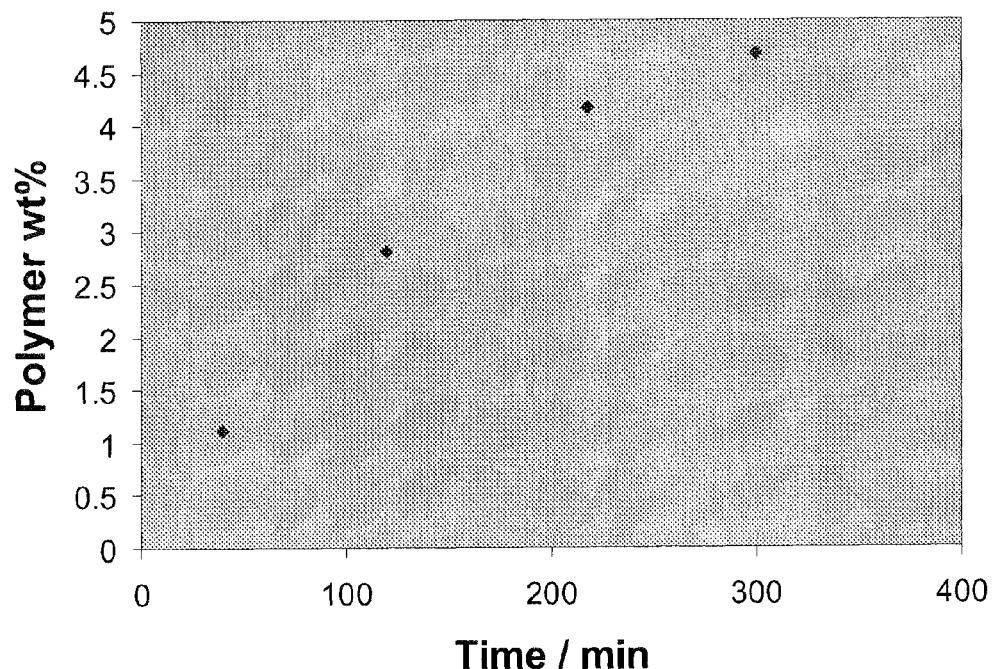
Figure 3. Polymerization kinetics of polymerization from Sparkle Silver 3622.
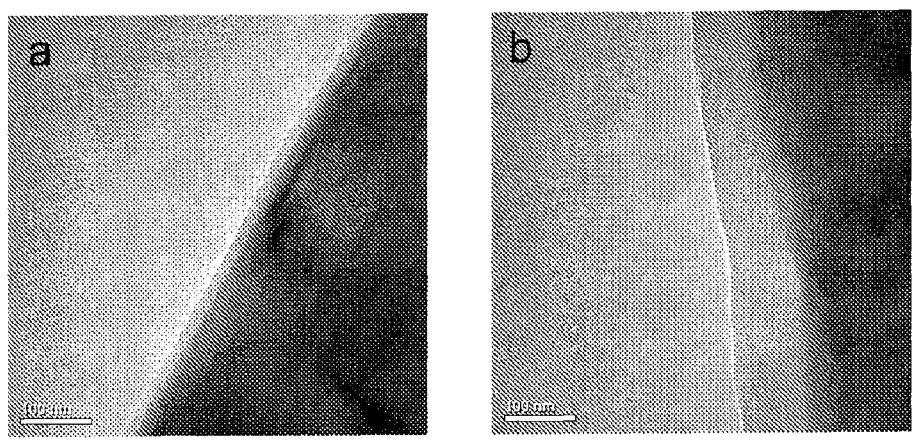
Figure 4. Transmission electron micrograph of polystyrene coated Sparkle Silver 3622 after 40 min (a) and 20 hours (b) polymerization time

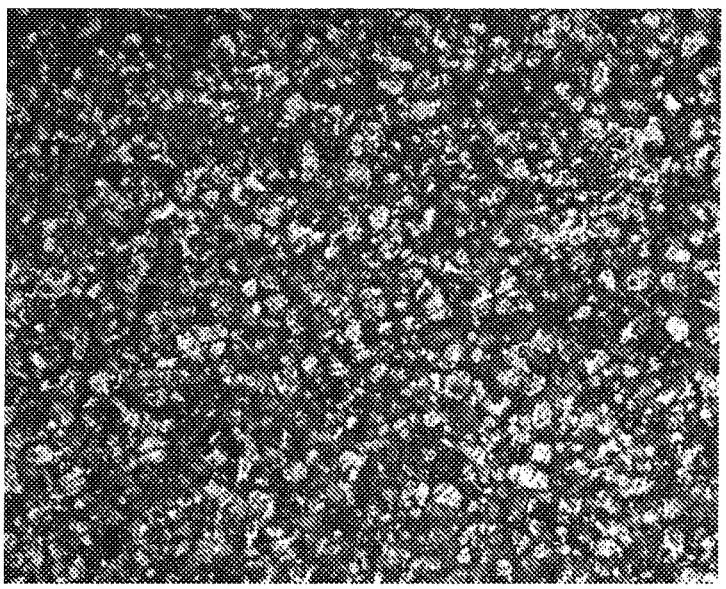
Figure 5. Dispersion of polystyrene encapsulated Al flakes in polystyrene resin

POLYMER ENCAPSULATED ALUMINUM PARTICULATES

FIELD

This disclosure relates generally to coated platelets and systems including the coated platelets, and particularly, to the design of polymer coated platelets and methods of producing the coated platelets, and to the design of systems including the coated platelets.

BACKGROUND

Effect pigments are used to introduce metallic or pearlescent luster to a wide range of products such as paints, coatings, inks, and plastics. One property of the pigment flakes is that they tend to orient in parallel to the surface during application due to their high aspect ratios. Among the various effect pigments, aluminum pigments are widely used for their ability to provide high reflection of light at specular angle and render metallic effects on products.

Performances of effect pigments depend on their interaction with their matrixes. Efforts have been made to enhance pigment dispersion and compatibility in the pigment's application environments.

The surface of a pigment can be treated with surface active reagents that can be either physically absorbed onto the pigment surfaces or chemically bonded to the pigment surfaces. U.S. Pat. No. 6,761,762 discloses modifying the surfaces of the pigments by using a surface-modifying reagent which have one surface active group that binds to the pigment surfaces and at least one more functional group to adjust the interaction between the pigments and their applied media.

Pigment surface modification and encapsulation have also been extensively utilized to introduce barrier functions, protect the pigment from environmental attacks and extend the shelf-life of the pigments and weatherability of the pigmented objects. It is known that aluminum readily reacts with water and forms hydrogen and aluminum hydroxide, thereby leading to gassing and discoloration. As more and more stringent environmental regulations require lower volatile organic compound (VOC) contents, there is an increase in demand for the use of aluminum pigments in waterborne paints and inks. During the manufacture of such applications, aluminum pigments are dispersed in media composed of polymers, water, and other solvents, and under typical application conditions, pigmented materials are frequently exposed to basic and/or acidic environments.

Efforts have been made to protect the aluminum flakes with inorganic and organic materials. For example, corrosion inhibition reagents such as organic phosphate (U.S. Pat. Nos. 4,565,716, 4,808,231), organic phosphite (U.S. Pat. No. 4,808,231), vanadium compounds, and chromium compounds (U.S. Pat. No. 4,693,754) have been investigated to mitigate gassing of aluminum flakes. However, improvements in the protection of aluminum pigments for waterborne applications are desired. Moreover, metallic pigments for the most part do not disperse well enough in either aqueous or solvent borne systems. Aluminum flakes with good gassing stability can be obtained via silica coating (U.S. Pat. No. 2,885,366; 3,954,496). However, the brittle silica coating can be damaged by excessive mechanical stress. Furthermore, to reduce the agglomeration and to improve dispersion of pigment flakes, additional surface treatment may be necessary to achieve acceptable performances.

Efforts also have been made to encapsulate the aluminum flake with a polymer coating to enhance their compatibility with the polymeric binders and provide barrier function to protect pigments. For example, U.S. Pat. No. 7,479,323 discloses pre-treating aluminum flakes with polyvinyl alcohol to improve the dispersion of pigments in aqueous media. U.S. Pat. No. 4,213,886 discloses procedures to modify aluminum flakes with monoethylenically unsaturated silane. In such procedures, free radical polymerization between the silane and acrylic monomers results in the formation of polymer coated pigments.

To enhance the compatibility of the pigment to the binder, functional groups can be incorporated into the polymer coating. With organosilane or polymer coating, the interaction between the pigment and the binder can be adjusted by mixing silanes or tuning the composition of polymers. However, such coatings fail to provide satisfactory protection of the aluminum flakes against gassing. Moreover, the poor adhesion between the polymer and the pigment surfaces may result in loss of desired properties.

In general, polymer coated pigments that have been developed thus far suffer from two disadvantages. First, the coating may be easily damaged due to poor adhesion between polymer and the substrate underneath. Second, while the incorporation of functional monomers into the polymer chains may improve the dispersion/compatibility of pigments inside an applied media, these functional groups may adversely affect the chemical resistance of the flakes.

In previous approaches, polymer chains have been either physically absorbed or loosely bounded to the pigment surfaces. In the former case, the absorbed polymer chains can be easily replaced by other polymers and solvents. In the latter one, polymers are formed through radical polymerization of monomers in solution with the presence of vinyl or other alkenyl and/or alkynyl unsaturated functional groups on flakes. Once radicals of propagation polymerization chain ends react with surface bounded vinyl groups, the polymer chains are covalently bounded to the surfaces. In this case, because of steric hindrance, polymer chains anchored on the surface at the early stage of the polymerization may prevent the radicals of unbounded polymer chains in solution from reacting with surfaces, thus reducing the grafting density and therefore the thickness of the polymer coating. Furthermore, free radical polymerization used in these approaches offers limited control of the structure of the polymer coatings as only random copolymers can be synthesized.

Additionally, the pigments are usually applied to a substrate within a formulation where they are dispersed in polymeric resins. However, the interactions between the pigments and the polymeric resin are so complex that great efforts have been made to address the compatibility between the pigments and the resin systems within the formulation.

SUMMARY

A coated platelet that includes a robust polymer coating that has substantially uniform structures, a method for producing the coated platelet and a system that includes the coated platelet are described. The term "platelet" herein means transparent, metallic, white or colored, mineral or organic particles of any form, which are insoluble in a physiological medium and are suitable for use in ink and paint compositions. The disclosed method involves immobilizing initiator molecules onto the surfaces of the platelet by using surface coupling groups and polymerization from initiating sites of the initiator anchored on the surface of the platelet. The disclosed method allows uniform growth of the polymer chains so as to produce robust coated platelets with a smooth coated surface. With "living" or "controlled" polymerization, polymer chains with narrow molecular weight distribution and block copolymers can be synthesized. The disclosed coated platelet can be used to produce optical effects, and can be inorganic pigments including, but not limited to, luster pigments, white pigments, colored pigments, black pigments and luminescent pigments. The disclosed system includes the coated platelet. The coated platelets can be easily dispersed within the disclosed system and applied onto a substrate without the addition of other polymer resins.

In one embodiment, the disclosed coated platelet includes a coating that has polymeric chains having substantially uniform structures so as to provide a smooth coated surface. In the case of effect pigments, such features enhance the aesthetic effects of the coated platelets. The coated platelet is also robust in that the polymeric chains are firmly attached to the substrate by high density covalent bonds.

In one example of the coated platelet, the polymeric chains can include homopolymers, random copolymers, gradient copolymers, block polymers, grafted copolymers, or any combination thereof. In one implementation, the polymer chains include cross-links to form a polymer network coating on the platelet.

In one embodiment of the method of producing the coated platelet, the method includes immobilizing an initiator onto the surface of a platelet. The initiator includes a surface active group and an initiator moiety and the surface of the platelet includes a functional group. The initiator molecule is immobilized by reacting the surface active group of the initiator molecule with the functional group on the surface of the platelet. The method further includes reacting the immobilized initiator molecule with one or more polymerizable monomers so that monomers are added to the initiator moiety and form a polymer chain attached to the surface of the platelet. The polymer chain has a first end that is covalently bounded to the surface of the platelet and a second end that includes a chain terminus capable of being reversibly terminated.

In another embodiment of the method of producing the coated platelet, the method includes immobilizing an initiator on an outerlayer of an encapsulated flake. In this instance, the outerlayer can include a sol-gel coating or a polymer coating.

In yet another embodiment, the polymer chains are cross-linked during or after the polymerization.

In one embodiment of the system, the system includes a solvent and a platelet with a dispersant and/or resin that is covalently attached to the surface of the platelet. In one example, the platelet with the dispersant and/or resin attached to its surface is the disclosed coated platelet. In one example, the system includes only the disclosed coated platelet and the solvent.

BRIEF DESCRIPTION OF THE DRAWINGS

FIG. 1 illustrates one embodiment of the disclosed coated platelet.

FIGS. 2a and 2b are scanning electron micrographs of a polystyrene coated platelet.

FIG. 3 shows the polymerization kinetics of polymerization from the coated platelet shown in FIGS. 2a and 2b.

FIG. 4a is a transmission electron micrograph of the coated platelet shown in FIG. 1 after 40 minutes of polymerization time.

FIG. 4b is a transmission electron micrograph of the coated platelet shown in FIG. 1 after 20 hours of polymerization time.

FIG. 5 shows the dispersion of polystyrene encapsulated aluminum flakes in polystyrene plastics.

DETAILED DESCRIPTION

With reference to FIG. 1, a coated platelet 10 includes a substrate 12 having a surface 12a. The surface 12a is coated with a coating 14 that has multiple layers 14a, 14b. In the illustrated embodiment shown in FIG. 1, the coating 14 includes two layers 14a, 14b, but in appropriate circumstances, the coating 14 can have one layer or more than two layers. Each of the layers 14a, 14b includes polymer chains 16. The composition of the polymer chains 16 in each of the layers may be the same or different. The polymer chains 16 are covalently bounded to the surface 12a of the substrate 12. The coating 14 can also include inter-chain cross-links 18 that link the polymer chains 16.

The substrate 12 used can be an inorganic substrate. The shape of the inorganic substrate can be, but is not limited to, a spherical, platelet-shaped, etc. The inorganic substrate can be, but is not limited to, platelet-shaped materials such as metal oxides, metal oxide encapsulated materials, silica, borosilica, silica coated materials, mica, glass, iron or aluminum. In one example, the platelet-shaped materials utilized include a platelet having a thickness in a range from 5 nm to 500 µm. In another example, the thickness of the platelet is in a range from 20 nm to 100 µm. In yet another example, the thickness of the platelet is in a range from 50 nm to 1 µm. In yet another example, the size of the platelet is in a range from 100 nm to 1000 µm. In yet another example, the size of the platelet is in a range from 500 nm to 100 µm. In yet another example, the size of the platelet is in a range from 1 µm to 50 µm.

The covalent bonds between the polymer chains 16 and the surface 12a of the substrate 12 provide robustness and stability of the coating. The term "robustness and stability of the coating" herein means the survivability of coated substrates under circulation test, repeated solvent wash, and typical reaction conditions.

The density of the polymer chains can range from 0.001 to 2 chain/nm$^2$. In one example, the density of the polymer chains that are covalently bounded to the surfaces of the platelet is at least 0.7 chain/nm$^2$ of platelet surface. As a result, the polymer coating is firmly anchored to the substrate by these high density covalent bonds. In one implementation, the coating is further fortified with inter-chain cross-links.

In yet another example, the polymer layer is uniform in structure. The term "uniform in structure" herein means that the distance between the surface of the platelet and the outer perimeter of the coated platelet is substantially the same across the surface of the platelets, such that the standard deviation of the average distance varies less than 15% as measured using a transmission electron microscope at a magnification between ×20,000 and ×100,000. For example, as shown in FIG. 4, the uniformity of the coating can be determined from direct observation under transmission electron microscope where the scale bar is 100 nm.

The uniformity of the polymer chains in the coating layer affects the performance of effect pigments. Defects on surfaces of the effect pigments may have distinctive optical properties, scatter light, or reflect light in an undesired manner. In the case of metallic effect pigments, such scattering or reflection will reduce the distinctness of image (DOI) and gloss of the coated surfaces. For effect pigments based on the Fabry-Perot principle, variation in film thickness or refractive index will alter the optical path length of the coating and lead to reduced chromatic strength and purity. In one implementation, the polymer chains in each of the layers are substantially uniform in structure so as to provide a smooth coating on the platelet surface and thereby enhance the aesthetic effect of the coated platelet.

Passivation of metallic effect pigments, in particular, aluminum pigments improve the durability of the pigments and their aesthetic effects. In one embodiment, the coated platelet includes a metallic platelet, and the metallic platelet is provided with a passivation layer, which serves as a barrier and prevents water or other chemicals from reaching the inner metallic core and thus enhances chemical stability of the platelets.

To reduce the agglomeration and to improve dispersion of pigment flakes, additional surface treatment may be necessary to achieve acceptable properties. In one embodiment, the coated platelet is further functionalized with a dispersion layer that is compatible with a solution or resin in which the coated platelets are dispersed to enhance dispersion and aesthetics. In one example, the platelet is an aluminum flake and the dispersion layer is polystyrene. In this example, the polystyrene encapsulates the aluminum flakes and can be readily blended into polystyrene plastic through compounding, as demonstrated in FIG. 5, or dissolved in organic solvents such as toluene, xylene, tetrahydrofuran, anisole, propylene glycol monomethyl ether acetate.

The polymer coating can provide additional barrier function to the platelets. In one implementation, the coating of the coated platelet includes an inner passivation layer and an outer dispersion layer so as to address both passivation and dispersion simultaneously. For platelets designed for waterborne systems, a hydrophobic inner layer may provide a barrier to prevent water from reaching the aluminum flakes. At the same time, a hydrophilic outer layer will allow the platelet to be dispersed into aqueous media. In one example, the inner passivation layer includes a hydrophobic polymer and the outer dispersion layer includes a hydrophilic polymer. Examples of hydrophobic polymers that can be used include polystyrene, poly(methyl methacrylate), poly(methyl acrylate), poly(n-butyl methacrylate), and poly(perfluorocyclohexylmethyl methacrylate). Examples of the hydrophilic polymers that can be used include poly(2-hydroxyethyl methacrylate), poly(dimethylaminoethyl methacrylate), poly(acrylic acid), poly(glycidyl methacrylate), poly(N-iso-propylacrylamide), poly(poly(ethylene glycol) methacrylate).

In yet another embodiment, the thickness of the coating is above about 100 nm. In one example, the coating includes multiple layers, and the composition and thickness of each individual layer can be independently controlled.

The disclosed method generally involves immobilizing initiator moieties onto the surfaces of the encapsulated platelets using surface coupling groups and forming polymer chains attached to the surfaces of the platelets using living polymerization. Through the course of living polymerization, propagation chain ends retain their initiating capability and polymer molecular weight increases with polymerization time. Therefore, the coating thickness can be readily controlled simply by varying the reaction time. In addition, other factors including, but not limited to, monomer concentration, polymerization time, solvent, and catalyst can be used to control the thickness of the coating as well. One of the advantages of the disclosed method is that it allows precise control of coating thickness at nanometer scale.

Two factors, grafting density and average molecular weight of polymer chains, also determine coating thickness. The molecular weight of the polymer chains can be adjusted by tuning the polymerization conditions such as polymerization time, monomer concentration, solvent, reaction temperature, and catalysts. Varying the grafting density can be achieved by controlling the initiator area density on the surfaces of the platelets. Using controlled/living radical polymerization, such as atom transfer radical polymerization (U.S. Pat. No. 5,763,548), nitroxide mediated polymerization (U.S. Pat. No. 6,353,107), and reversible addition—fragmentation chain transfer polymerization (U.S. Pat. No. 7,205,362), the disclosed method allows polymer chains to grow at similar rates from surfaces, leading to a coating with a uniform structure on the surface of the platelets.

Moreover, by eliminating unbounded initiators in solution, most polymer chains formed are anchored to platelet surfaces. As a result, there are minimal amounts of unbounded polymer chains in solution. The polymerization mixture retains low viscosity throughout the reaction process with or without the addition of solvent. Simple purification procedures can readily separate polymer encapsulated platelets from the other components in the reaction solution.

In one embodiment, a coupling reagent that includes an initiator is used to functionalize platelet surfaces with initiator moieties. In one example, the initiator has a chemical structure X—R—Y, where X denotes a surface active group, Y denotes an initiator moiety, and R denotes a spacer. The initiator moieties are anchored to the platelet upon the reaction between surface active groups and functional groups that are present on surfaces of the platelets.

Alternatively, an initiator can be immobilized on platelet surfaces through a multiple step process. In one example, the multiple step process is a two-step process. In this instance, a surface active molecule, X-R1-A, is first applied to the surface of a platelet. While functional group X immobilizes the molecules to the surfaces, functional group A allows further chemical reactions on platelet surfaces and leads to the initiator moiety, Y, to be on the surfaces of the platelet.

In one implementation, the platelets utilized are aluminum flakes. The aluminum flakes used can be, but are not limited to, conventional ball milled flakes, vacuum metallized flakes (VMF), silica encapsulated flakes, and metal oxide encapsulated flakes. Once exposed in air, the surface of aluminum reacts with oxygen forming aluminum oxide and aluminum hydroxide, and provides the surface hydroxyl groups necessary for the coupling reaction.

The surface active group X can be, but is not limited to, mono-, di-, and tri-alkoxylsilanes, mono-, di- and tri-chlorosilanes, carboxylic acid, organophosphorous compounds, and other chemical groups that have strong affinity to metal, metal oxide or silica surfaces. In case of trialkoxysilane and trichlorosilane, the intermolecular condensation among organosilane molecules leads to the formation of high density robust coating of such molecules.

The density of the initiators on the surface of the platelet can be adjusted by diluting the initiator bearing molecules with other surface active molecules. The diluting molecules may also bring additional functional groups to the surfaces.

By applying the same principle, glass flakes, which are mainly composed of silicon dioxide and some silanol groups on the surface, can be readily functionalized with similar coupling reagents. The disclosed method may be further applied to platelets other than aluminum and silica, so long as there is an existence of a functional group that has strong affinity to the platelet surfaces and immobilized initiator moieties to the platelet.

Other platelets also may be functionalized with initiators via silica or metal oxide encapsulation. For example, Iriodin 100, which is titanium oxide encapsulated mica, can be coated with polymers with the approach discussed above.

The surface property of the platelet is a function of the surface reactivity, but not the shape of the platelet.

The initiator moiety Y can be any functional group that initiates free radical polymerization, controlled radical polymerization, and/or other chain polymerization. The initiator moiety Y can be, but is not limited to, an activated halogen atom, alkoxyamine, dithioester, dithiocarbamates, trithiocarbonates, xanthates organic peroxides, and azo compounds.

In one example, after the initiator is immobilized on the surface of the platelet, the platelet is purified via filtration to remove any unbounded coupling reagents before proceeding to the polymerization reaction. In another example where the existence of free coupling reagent in solution does not significantly increase the solution viscosity or adversely alter other process conditions in the following polymerization, the reaction solution is used directly without further purification.

The initiator-immobilized platelets then are dispersed in a monomer solution. The monomer solution can include one type of monomer or mixtures of different types of monomers. Examples of monomers that can be used include, but is not limited to, styrenes, (meth)acrylates, (meth)acrylamides, (meth)acrylic acids, acrylonitrile, vinylpyridines, maleimides, vinyl acetate, vinyl chloride, vinylidene chloride and isoprene. Following dispersion of the initiator immobilized platelets into the monomer solution, polymerization from surfaces lead to the formation of polymer chains that are covalently bounded to the platelet. Because of its small size, initiator molecules can be immobilized on the surface of the platelet with high area density. Therefore, this approach allows the synthesis of polymer coatings with high grafting density.

As polymerization from the surface of the platelet follows the same mechanism as solution polymerization, monomers that can be polymerized in solution polymerization can be directly adopted into the disclosed method.

Living or controlled radical polymerization, such as atom transfer radical polymerization, nitroxide mediated polymerization, and reversible addition-fragmentation chain transfer polymerization, allows synthesis of polymers with controlled molecular weight, polydispersity, and architectures from many different types of monomers. By using living polymerization, the disclosed method allows the thickness of the coating to be controlled from a few nanometers up to hundreds of nanometers and further allows the structure of polymer coating on platelets to be controlled. Transmission electron microscopy is used to directly observe the coating thickness and uniformity on particle or platelet surfaces. In this instance, the average and standard deviation of coating thickness can be calculated from transmission electron microscope pictures from more than 10 different coated platelets at a magnification between ×20,000 and ×100,000. As shown in FIG. 4, the standard deviation of the coating thickness on the platelets varies less than 15% of the average coating thickness, where the scale bar is 100 nm.

The living nature of the controlled radial polymerization used in the disclosed method also enables the synthesis of a multilayered coating on the platelet. In one example, a second monomer or a second set of monomers can be added to the reaction flask after a predetermined reaction time. In another example, after the end of the first polymerization, the platelets can be separated from the reaction mixtures, purified, and then subjected to a second polymerization with a second monomer or second set of monomers. In both cases, a second layer of coating can be formed with a composition that is different from that of the first layer. In the latter approach, the method allows the synthesis of a second layer with a completely different composition. The above steps can be repeated any number of times and in any different combinations to provide a multilayered coating.

Examples of monomers that can be used in the disclosed method include, but are not limited to, acrylonitrile, styrene, divinylbenzene, 4-methylstyrene, 3-methylstyrene, 2-methylstyrene, 4-vinylanisole, 4-fluorostyrene, 2-fluorostyrene, 3-fluorostyrene, 4-chloromethylstyrene, 4-(tert-butyl)styrene, 3-chlorostyrene, methyl methacrylate, methyl acrylate, ethyl methacrylate, ethyl acrylate, n-propyl acrylate, n-propyl methacrylate, iso-propyl methacrylate, iso-propyl acrylate, n-butyl acrylate, n-butyl methacrylate, sec-butyl acrylate, sec-butyl methacrylate, tert-butyl acrylate, tert-butyl methacrylate, tert-amyl methacrylate, n-hexyl acrylate, n-octyl methacrylate, 2-ethylhexyl acrylate, n-decyl methacrylate, iso-decyl acrylate, iso-decyl methacrylate, undecyl methacrylate, n-dodecyl acrylate, n-dodecyl methacrylate, 1-hexadecyl methacrylate, stearyl acrylate, stearyl methacrylate, cyclohexyl acrylate, cyclohexyl methacrylate, 3,3,5-trimethylcyclohexyl methacrylate, isobornyl methacrylate, benzyl acrylate, benzyl methacrylate, pentabromophenyl acrylate, pentabromophenyl methacrylate, pentafluorophenyl acrylate, pentafluorophenyl methacrylate, phenyl acrylate, phenyl methacrylate, 1,1,1,3,3,3-hexafluoroisopropyl acrylate, 1H,1H,2H,2H-heptadecafluorodecyl acrylate, 1H,1H,2H,2H-heptadecafluorodecyl methacrylate, 1H,1H,3H-hexafluorobutyl acrylate, 1H,1H,3H-hexafluorobutyl methacrylate, 1H,1H,3H-tetrafluoropropyl methacrylate, 1H,1H,5H-octafluoropentyl acrylate, 1H,1H,5H-octafluoropentyl methacrylate, 1H,1H,7H-dodecafluoroheptyl methacrylate, 1H,1H-heptafluorobutyl acrylate, 2,2,2-trifluoroethyl acrylate, 2,2,2-trifluoroethyl methacrylate, hexafluoro-iso-propyl methacrylate, pentafluorophenyl acrylate, pentafluorophenyl methacrylate, perfluorocyclohexylmethyl methacrylate methacrylamide, acrylamides, 4-vinyl pyridine, N,N-dimethylaminoethyl methacrylate, N,N-diethylaminoethyl methacrylate, glycidyl methacrylate, 2-hydroxyethyl acrylate, and 2-hydroxyethyl methacrylate, glycidyl acrylate, 4-vinylaniline, 3-vinylaniline, N-iso-propylacrylamide, N,N-diethylacrylamide, N,N-dimethylacrylamide, poly(ethylene glycol) methacrylate, poly(ethylene glycol) acrylate, poly(ethylene glycol) methyl ether methacrylate, poly(ethylene glycol) ethyl ether methacrylate, poly(ethylene glycol) methyl ether acrylate, 1,10-decanediol dimethacrylate, 1,3-butanediol dimethacrylate, 1,4-butanediol diacrylate, 1,4-butanediol dimethacrylate, 1,4-diacryloylpiperazine, 1,4-phenylene diacrylate, 1,5-pentanediol dimethacrylate, 1,6-hexanediol diacrylate, 1,6-hexanediol dimethacrylate, 1,9-nonanediol dimethacrylate, 2,2-bis(4-methacryloxyphenyl)propane, 2,2-bis[4-(2-acryloxyethoxy)phenyl]propane, 2,2-bis[4-(2-hydroxy-3-methacryloxypropoxy)phenyl]propane, 2,2-dimethylpropanediol dimethacrylate, diethylene glycol diacrylate, diethylene glycol dimethacrylate, dipropylene glycol dimethacrylate, ethylene glycol diacrylate, ethylene glycol dimethacrylate, ethylene glycol dimethacrylate, ethylene glycol dimethacrylate, N, N'ethylene bisacrylamide, N,N'-methylenebisacrylamide, N,N'-hexamethylenebisacrylamide, N,N-diallylacrylamide, tetraethylene glycol dimethacrylate, trans-1,4-cyclohexanediol dimethacrylate, triethylene glycol diacrylate, triethylene glycol dimethacrylate, triethylene glycol dimethacrylate, 1,1,1-trimethylolpropane triacrylate, 1,1,1-trimethylolpropane trimethacrylate, dipentaerythritol pentaacrylate, pentaerythritol tetraacrylate, pentaerythritol triacrylate, poly(ethylene glycol) diacrylate, and poly(ethylene glycol) dimethacrylate.

One of the advantages of the disclosed method is that it can address critical issues simultaneously, by providing a way to control the properties of the coating. For example, as discussed above, two critical issues in effect pigments are passivation and dispersion. The disclosed method can address these two issues simultaneously by providing coating the surface of the platelet with a passivation layer, and then further coating the passivation layer with a dispersion layer.

In addition, the disclosed method allows the incorporation of other inorganic and organic colorants onto the flakes. For example, colorant molecules can be coupled with the functional groups of the polymer or modified with vinyl groups and used as monomer for polymerization.

In another embodiment, the coating further includes other inorganic and organic colorant nanoparticles in addition to the dispersion and passivation layers. In one example, nanoparticles are absorbed on surfaces of a complimentary polymer surface. If their sizes are small enough, nanoparticles may be embedded into the polymer network. In one implementation, the colorants stably adhere to the polymer network of the coated platelet. The term "stable" is defined as the extent of difficulties to separate the color pigments from the polymer coated platelets in the physiological environment within typical paint/ink systems.

In one embodiment, the disclosed system includes platelets with dispersants and/or resins covalently attached to their individual surfaces. In one example, the system does not require any additional dispersants and/or resins other than those that are covalently bounded to the surface of the platelet. The term "additional dispersants and/or resins" herein means polymers that are separate from the polymer chains that are attached to the surface of the platelet, and are commonly added in the art as dispersing, film forming and/or adhesive agents to coating formulations such as inks and paints. The additional resins, for example, can be alkyd, polyester, polyamide, polyimide, silicone, phenolic, urea, melamine, epoxy, polyurethane, polyolefines, polyvinyl, and polyacrylic resins. Examples of the additional dispersants can be found in Organic coatings: science and technology, third edition (New York: John Wiley & Sons, 2007), pages 440 and 446, which is incorporated herein by reference.

In one implementation, the dispersants and/or resins that are covalently attached to surfaces of the platelets are polymers or polymer networks. In this instance, the dispersants and/or resins that are covalently attached to the platelets are added in amounts sufficient to enable film formation. In another instance, the dispersants and/or resins are added in amounts sufficient to adhere the film onto a substrate. In yet another instance, the dispersants and/or resins are added in amounts to disperse the platelets in a solvent. The term "solvent" herein means a liquid that carries the components of the final coating so they can be applied to a substrate and then is removed by evaporation, treating, etc. In one approach, standard polymer encapsulation techniques and/or surface-initiated polymerization techniques are employed to encapsulate the platelets with the dispersants and/or resins. In one implementation of this approach, the resulting platelets are the disclosed coated platelets. In this instance, the disclosed coated platelets can be, but are not limited to, polystyrene coated Sparkle Silver® Premier 695 and poly(dimethylaminoethyl methacrylate)-b-polystyrene coated Sparkle Silver® Premier 695. In yet another example, the disclosed system includes the disclosed coated platelets and solvent only.

Examples of solvents that can be used in the disclosed system include, but are not limited to, organic solvent, water, alcohols and/or mixtures thereof. In one example, the solvent is included in amount sufficient to disperse the platelets.

The concepts described herein can be applied to, but not limited to, ink and paint system.

One of the advantages of the disclosed system is that the attached polymers of the platelets not only help disperse the coated platelets in the solvents, but also enable film formation and adhesion of the film onto substrates without the addition of other polymer resins, thereby eliminating the need to add polymer resins separate from the resins that are covalently attached to the platelet. As a result, the preparation process of the system is greatly simplified.

EXAMPLES

Example 1

Preparation of Polystyrene Coated Silberline Sparkle Silver® 3622

Step 1. Initiator Immobilization

To a 2 L reaction flask equipped with a stirrer and a condenser, the following chemicals were added:
1. 600 g aluminum paste (Silberline Sparkle Silver® 3622, 79.3% nonvolatile)
1. 2 mL 3-(trimethoxysilylpropyl)-2-bromo-2-methylpropionate
2. 1600 mL toluene The reaction mixture was heated up to 100 ° C. overnight.

Once the reaction time was complete, the mixture was cooled down to room temperature. The flakes were vacuum filtered. Three washes of toluene were applied.

Step 2. Polymerization

The polymerization was carried out in the fumehood, using a 2 L reaction flask equipped with a stirrer and heating mantle.

To the reaction flask, the following reagents were added:
1. 5.008 g CuBr
2. 800 mL styrene
3. 92 g Al paste (containing 80 g of nonvolatile)
4. 788 mL propylene glycol monomethyl ether acetate In a separated flask, pentamethyldiethylenetriamine (PMDETA) was degassed with nitrogen for 30 min. Then 7.3 mL of degassed PMDETA was transferred to the reaction flask with a nitrogen purged syringe. The solution was heated to 60° C. The reaction was stopped after a given period of reaction time.

After the polymerization, the polymer coated platelets was purified via centrifugation, washed with propylene glycol monomethyl ether acetate, and precipitated out in ethanol. The sample was further dried in an oven and further analyzed with scanning electron microscopy, transmission electron microscopy and thermogravimetric analysis.

Analysis of Example 1

FIGS. 2a and 2b show the scanning electron micrograph of the polystryrene coated Sparkle Silver® 3622 obtained in Example 1.

FIG. 3 shows the polymerization kinetics of polymerization from Sparkle Silver® 3622. The weight percentage of polymer to the overall platelet is obtained from thermogravimetric analysis. As shown in FIG. 3, the amount of polystyrene coating on Silberline Sparkle Silver® 3622 increased with reaction time. For polymerization of less than 4 hours, the amount of polymer coating increased linearly with polymerization time.

FIGS. 4a and 4b show the transmission electron micrograph analysis after 40 minutes and 20 hours, respectively, of polymerization time. These figures directly confirmed that a thick polymer coating was formed over an extended reaction time.

Example 2

Preparation of poly(methyl methacrylate) Coated Silberline Sparkle Silver® 3622

Step 1. Initiator Immobilization
same as Example 1
Step 2. Polymerization
To a 500 mL reaction flask equipped with a mechanical stirrer and a heating mantle, the following reagents were added:
1. 0.501 g CuBr
2. 240 mL methyl methacrylate
3. 27.6 g Al paste (containing 24 g nonvolatile)
4. 236.4 mL propylene glycol monomethyl ether acetate The solution was degassed with nitrogen and heated to 60° C. under constant stirring. In a separated flask, PMDETA was degassed with nitrogen for 30 min. Then 0.73 mL of degassed PMDETA was transferred to the reaction flask with a nitrogen purged syringe. The reaction mixture was kept at 60° C.

Example 3

Preparation of Polystyrene Coated Silberline Sparkle Silver® Premium 695

Step 1. Initiator Immobilization
To a 2 L reaction flask equipped with a mechanic stirrer and a condenser, the following chemicals to were added.
1. 480 g aluminum paste (Silberline Sparkle Silver® Premium 695, 75.28% nonvolatile)
2. 3 mL 3-(trimethoxysilylpropyl)-2-bromo-2-methylpropionate
3. 1200 mL toluene The reaction mixture was heated up and was kept under reflux for 24 hours. Once the reaction time was complete, the mixture was cooled down to room temperature. The flakes were vacuum filtered. Two washes of toluene were applied.
Step 2. Polymerization
To a 500 mL reaction flask equipped with a mechanical stirrer and a heating mantle, the following reagents were added:
1. 0.564 g CuBr
2. 270 mL styrene
3. 130.4 g Al paste (containing 76.5 g of nonvolatile)
4. 227 mL toluene The solution was degassed with nitrogen and heated to 60° C. under constant stirring.
In a separated flask, PMDETA was degassed with nitrogen for 30 min. Then 0.83 mL of degassed PMDETA was transferred to the reaction flask with a nitrogen purged syringe.

Example 4

Preparation of poly(t-butyl acrylate) Coated Silberline Sparkle Silver® Premium 695

Step 1. Initiator Immobilization
same as Example 3
Step 2. Polymerization
To a 100 mL reaction flask, a stir bar and the following reagents were added:
1. 0.188 g CuBr
2. 30 mL t-butyl acrylate
3. 4.83 g Al paste (containing 3 g of nonvolatile)
4. 30 mL propylene glycol monomethyl ether acetate The solution was degassed with nitrogen and heated to 60° C. in oil bath. In a separated flask, PMDETA was degassed with nitrogen for 30 min. Then 0.275 mL of degassed PMDETA was transferred to the reaction flask with a nitrogen purged syringe. The solution was kept at 60° C.

Example 5

Preparation of poly(styrene-b-dimethylaminoethyl methacrylate) Coated Silberline Sparkle Silver® Premium 695

Step 1. Initiator immobilization
same as Example 3
Step 2. Polymerization
First Polymerization
To a 2 L reaction flask equipped with a mechanical stirrer and a heating mantle, the following reagents were added:
1. 1.128 g CuBr
2. 540 mL Styrene
3. 260.8 g Al paste (containing 153 g of nonvolatile)
4. 454 mL propylene glycol monomethyl ether acetate The solution was degassed with nitrogen and heated to 60° C. under constant stirring.
In a separated flask, PMDETA was degassed with nitrogen for 30 min. Then 1.66 mL of degassed PMDETA was transferred to the reaction flask with a nitrogen purged syringe. The solution was kept at 60° C. After 2 hours of polymerization, the reaction mixture was cooled down and the Al paste was purified via centrifugation.
Second Polymerization
To a 100 mL reaction flask equipped with a stirrer bar and an oil bath, a stir bar and the following reagents were added:
1. 125.4 mg CuBr
2. 20 mL dimethylaminoethyl methacrylate
3. 5 g Al paste (containing 2 g of nonvolatile)
4. 20 mL propylene glycol monomethyl ether acetate The solution was degassed with nitrogen and heated to 60° C. under constant stirring. In a separated flask, pentamethyldiethylenetriamine (PMDETA) was degassed with Nitrogen for 30 min. Then 183 μL of degassed PMDETA was transferred to the reaction flask with a nitrogen purged syringe.

Example 6

Preparation of Polystyrene Coated Iriodin® 100

Step 1. Initiator Immobilization
To a 500 mL round bottom flask equipped with a magnetic stirring bar and a condenser, the following chemicals were added:
1. 37.5 g Iriodin® 100 (Merck Chemicals)
2. 0.3 mL 3-(trimethoxysilylpropyl)-2-bromo-2-methylpropionate
3. 300 mL Toluene The reaction mixture was heated up and was kept under reflux for 18 hours. Once the reaction time was complete, the mixture was cooled down to room temperature. The flakes were filtered and washed with toluene.
Step 2. Polymerization
To a 100 mL reaction flask, a stir bar and the following reagents were added:
1. 0.25 g CuBr
2. 40 mL styrene 3. 6.38 g Iriondin® 100 paste (containing 4 g of nonvolatile)
4. 40 mL Toluene The solution was heated to 60° C. In a separated flask, PMDETA was degassed with nitrogen for 30 min. Then 0.37 mL of degassed PMDETA was transferred to the reaction flask with a nitrogen purged syringe. The solution was kept at 60° C.

Example 7

Preparation of poly(methyl methacrylate) Coated Silberline Sparkle Silver® Premium 695

Step 1. Initiator Immobilization
To a 20 L reaction flask equipped with a mechanic stirrer and a condenser, the following chemicals were added.
1. 4800 g aluminum paste (Silberline Sparkle Silver® Premium 695, 75.68% nonvolatile)
2. 12 L propylene glycol monomethyl ether acetate The reaction mixture was heated up to 80° C.
Then, 16 mL 3-(trimethoxysilylpropyl)-2-bromo-2-methylpropionate was added. The reaction mixture was kept at 80° C. for 6 hours. Once the reaction time was complete, the mixture was cooled down to room temperature. The flakes were vacuum filtered. Two washes of propylene glycol monomethyl ether acetate were applied.

Step 2. Polymerization
A 500 mL reaction flask was equipped with a mechanical stirrer and a heating mantle. To the reaction flask, the following reagents were added:
1. 200 mL methyl methacrylate
2. 61.6 g Al flakes (containing 40 g of nonvolatile)
3. 180 mL propylene glycol monomethyl ether acetate
4. 0.106 g CuBr The solution was degassed with argon for additional 60 min and heated to 40° C. In a separated flask, PMDETA was degassed with Argon for 30 min. Then 0.16 mL of degassed PMDETA was transferred to the reaction flask with an argon purged syringe. The reaction mixture was kept at 40° C.

Example 8

Preparation of poly(methyl methacrylate) Coated Silberline Sparkle Silver® Premium 695

Same as Example 7 except the reaction temperature in step 2 is 50° C.

Example 9

Preparation of poly(methyl methacrylate) Coated Silberline Sparkle Silver® Premium 695

Same as Example 7 except the reaction temperature in step 2 is 60° C.

Example 10

Preparation of poly(trimethylolpropane trimethacrylate) Coated Silberline Sparkle Silver® Premium 695

Step 1. Initiator Immobilization
Same as example 7
Step 2. Polymerization
A 500 mL reaction flask was equipped with a mechanical stirrer and a heating mantle. To the reaction flask, the following reagents were added:
1. 20 mL trimethylolpropane trimethacrylate
2. 61.6 g Al flakes (containing 40 g of nonvolatile)
3. 360 mL propylene glycol monomethyl ether acetate
4. 0.106 g CuBr The solution was degassed with argon for additional 60 min and heated to 40° C. In a separated flask, PMDETA was degassed with argon for 30 min. Then 0.16 mL of degassed PMDETA was transferred to the reaction flask with an argon purged syringe. The reaction mixture was kept at 40° C.

Example 11

Preparation of poly(glycidyl methacrylate) Coated Silberline Sparkle Silver® Premium 695

Step 1. Initiator Immobilization
Same as example 7
Step 2. Polymerization
A 500 mL reaction flask was equipped with a mechanical stirrer and a heating mantle. To the reaction flask, the following reagents were added:
5. 200 mL glycidyl methacrylate
6. 61.6 g Al flakes (containing 40 g of nonvolatile)
7. 180 mL propylene glycol monomethyl ether acetate
8. 0.106 g CuBr The solution was degassed with argon for additional 60 min and heated to 60° C. In a separated flask, PMDETA was degassed with argon for 30 min. Then 0.16 mL of degassed PMDETA was transferred to the reaction flask with an argon purged syringe. The reaction mixture was kept at 60° C.

Example 12

Preparation of poly(dimethylaminoethyl methacrylate) Coated Silberline Sparkle Silver® Premium 695

Step 1. Initiator Immobilization
Same as example 7
Step 2. Polymerization
A 2 L reaction flask was equipped with a mechanical stirrer and a heating mantle. To the reaction flask, the following reagents were added:
1. 480 mL dimethylaminoethyl methacrylate
2. 123.2 g Al flakes (containing 80 g of nonvolatile)
3. 1075 mL propylene glycol monomethyl ether acetate The solution was degassed with Argon for 30 min before 0.106 g CuBr was added. The reaction mixture was degassed with Argon for additional 60 min and heated to 60° C. In a separated flask, PMDETA was degassed with Argon for 30 min. Then 2.5 mL of degassed PMDETA was transferred to the reaction flask with an argon purged syringe. The reaction mixture was kept at 60° C.

Example 13

Preparation of Polystyrene Coated Silberline Sparkle Silver® Premium 695

Step 1
Same as example 7
Step 2. Polymerization
A 500 mL reaction flask was equipped with a mechanical stirrer and a heating mantle. To the reaction flask, the following reagents were added:
1. 200 mL styrene
2. 61.6 g Al flakes (containing 40 g of nonvolatile)

3. 180 mL propylene glycol monomethyl ether acetate
4. 0.106 g CuBr

The reaction mixture was degassed with Argon for additional 60 min and heated to 60° C. In a separated flask, PMDETA was degassed with Argon for 30 min. Then 0.16 mL of degassed PMDETA was transferred to the reaction flask with an argon purged syringe. The reaction mixture was kept at 60° C.

Example 14

Preparation of Polystyrene Coated Silberline Sparkle Silver® Premium 695

Same as example 13 except the amount of styrene and propylene glycol monomethyl ether acetate used in the polymerization were 80 L and 300 mL, respectively.

Example 15

Preparation of poly(perfluorocyclohexylmethyl methacrylate) Coated Silberline Starbrite® 4102

A 500 mL reaction flask was equipped with a mechanical stirrer and a heating mantle. To the reaction flask, the following reagents were added:
1. 40 g Silberline Starbrite® 4102 in ethyl acetate (10.102% nonvolatile)
2. 0.05 mL 3-(trimethoxysilylpropyl)-2-bromo-2-methylpropionate
3. 260 mL propylene glycol monomethyl ether acetate The reaction mixture was heated to 110° C. for 2 hr.

The reaction mixture was cooled down to 60° C. and followed by the additional of the following reagents.
1. 100 mL propylene glycol monomethyl ether acetate
2. 10 mL perfluorocyclohexylmethyl methacrylate
3. 0.4 g CuBr The solution was degassed with nitrogen. Then 0.59 mL degassed PMDETA was transferred into the reaction mixture. The reaction was kept at 60° C.

Example 16

Preparation of poly(n-butyl methacrylate-co-isobornyl methacrylate) Coated Silberline Sparkle Silver® 3622

Step 1. Initiator Immobilization

To a 4 L reaction flask equipped with a stirrer and a condenser, the following chemicals were added to the reaction flask
1. 900 g aluminum paste (Silberline Sparkle Silver® 3622, 79.3% nonvolatile)
2. 3 mL 3-(trimethoxysilylpropyl)-2-bromo-2-methylpropionate
3. 2400 mL propylene glycol monomethyl ether acetate The reaction mixture was heated up to 110° C. overnight.

Once the reaction time was complete, the mixture was cooled down to room temperature. The flakes were vacuum filtered. Three washes of toluene were applied.

Step 2. Polymerization

To a 500 mL reaction flask equipped with a mechanical stirrer and a heating mantle, the following reagents were added:
1. 0.4 g CuBr
2. 20 mL isobornyl methacrylate
3. 20 mL n-butyl methacrylate
4. 58.16 g Al flakes (containing 40 g of nonvolatile)
5. 342 mL propylene glycol monomethyl ether acetate The solution was degassed with nitrogen and heated to 60° C. In a separated flask, PMDETA was degassed with nitrogen for 30 min. Then 0.58 mL of degassed PMDETA was transferred to the reaction flask with a nitrogen purged syringe. The solution was kept at 60° C.

Example 17

Preparation of Polystyrene Coated Silberline Starbrite® 4102

To a 500 mL reaction flask equipped with a mechanical stirrer and a heating mantle, add the following chemicals to the reaction flask
1. 60 g aluminum paste (Silberline StarBrite 4102-PMAC)
2. 240 mL propylene glycol monomethyl ether acetate The mixture was heated up to 80° C. and the stirrer was kept at a rotating speed of 800 rpm. Then 0.1 mL 3-(trimethoxysilylpropyl)-2-bromo-2-methylpropionate was added.

After 3 hours, 100 mL of styrene was added (used as received, from Aldrich) and the reaction mixture was cooled down to 60° C. The solution was degassed with argon for 30 min before CuBr (0.106 g) was added to the reaction mixture. The solution was degassed with argon for additional 60 min In a separated flask, PMDETA was degassed with argon for 30 min. Then 0.16 mL of degassed PMDETA was transferred to the reaction flask with an argon purged syringe. The reaction mixture was kept at 60° C.

While the disclosed coated platelets and methods have been described in conjunction with a preferred embodiment, it will be apparent to one skilled in the art that other objects and refinements of the disclosed coated platelets and methods may be made within the purview and scope of the disclosure.

The disclosure, in its various aspects and disclosed forms, is well adapted to the attainment of the stated objects and advantages of others. The disclosed details are not to be taken as limitations on the claims.

The invention claimed is:
1. A coated platelet, comprising:
    a platelet;
    a coating that is obtained by reacting a surface active group of an initiator molecule with a functional group on the surface of the platelet, thereby immobilizing the initiator directly on the platelet, and polymerizing one or more polymerizable monomers from the immobilized initiator so that the one or more polymerizable monomers are added to the initiator moiety and form a polymer chain attached to the surface of the platelet, the coating having at least one layer, the at least one layer including polymer chains,
    wherein the polymer chains are substantially uniform in structure,
    wherein the polymer chains surrounding the surface of the platelet are covalently bonded to the surface of the platelet,
    wherein the platelet is an aluminum flake,
    wherein the functional group on the surface of the platelet is a hydroxyl group, wherein the density of the polymer chains is at least 0.7 chain/nm$^2$ and wherein a standard deviation of an average coating thickness varies less than 15% as measured using a transmission electron microscope at a magnification between ×20,000 and ×100,000.

2. The coated platelet of claim 1, wherein the coating has a plurality of layers, each layer including the polymer chains, the polymer chains in each layer being substantially uniform in structure.

3. The coated platelet of claim 1, wherein the coating includes an inner passivation layer and an outer dispersion layer.

4. The coated platelet of claim 1, wherein the coating includes inorganic and organic colorants.

5. The coated platelet of claim 1, wherein the coating includes inter-chain cross-links.

* * * * *